July 30, 1968  D. L. WHITE  3,394,667
SEED PLANTER
Filed July 22, 1966  3 Sheets-Sheet 1
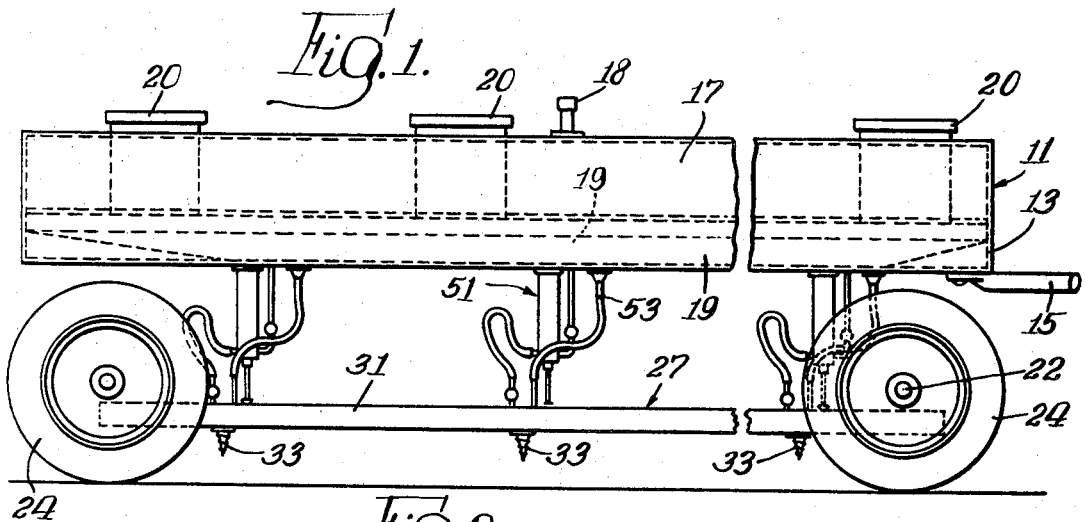
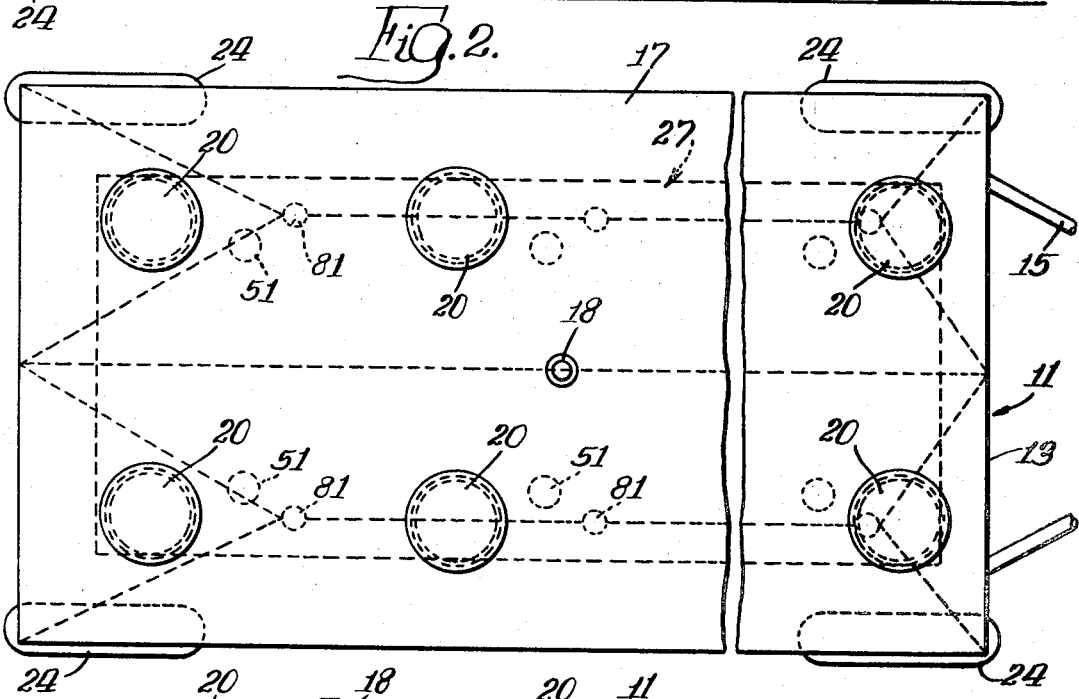
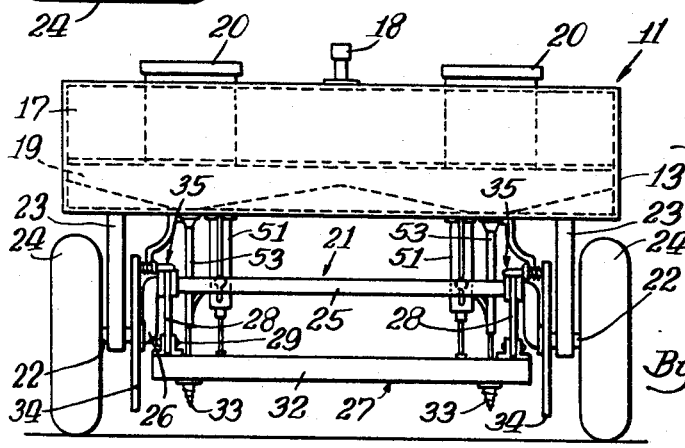
Inventor:-
D. Lasch White,
By Brown, Jackson,
Boettcher & Dienner
Attys.

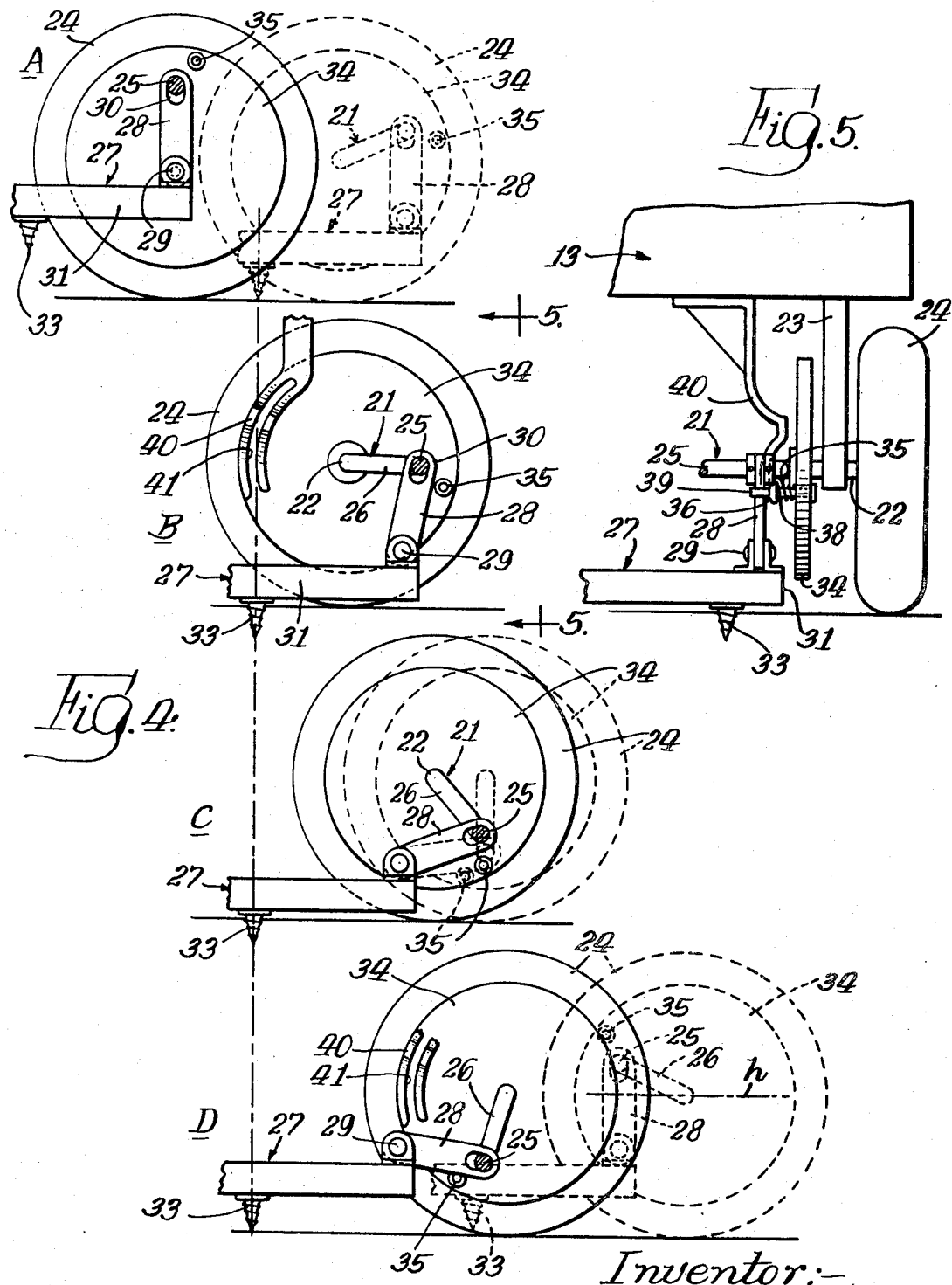

July 30, 1968   D. L. WHITE   3,394,667
SEED PLANTER
Filed July 22, 1966   3 Sheets-Sheet 3
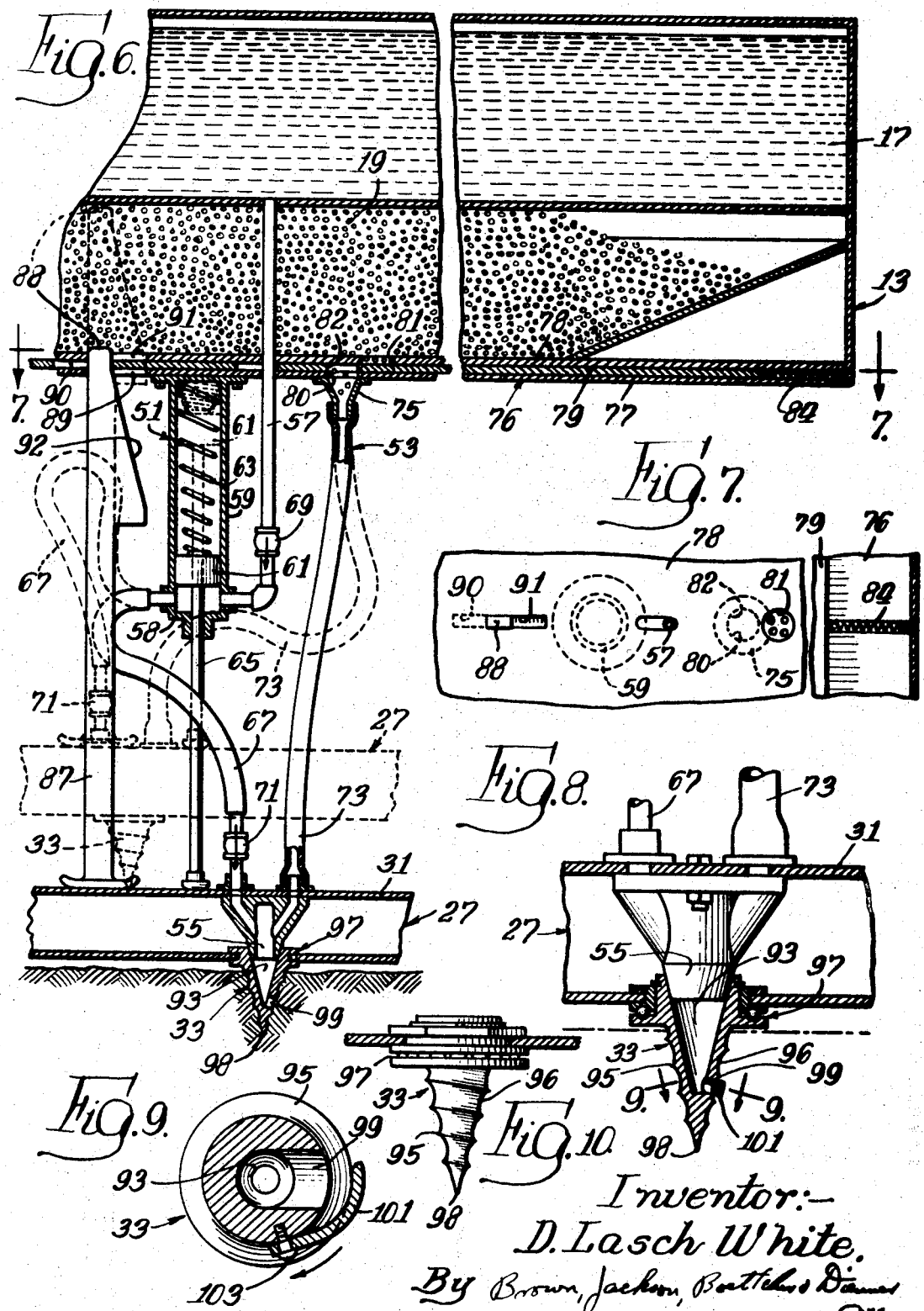
Inventor:—
D. Lasch White.
By Brown, Jackson, Boettcher & Dienner
Attys.

United States Patent Office 3,394,667
Patented July 30, 1968

3,394,667
SEED PLANTER
D. Lasch White, 2431 N. Burling, Chicago, Ill. 60614
Filed July 22, 1966, Ser. No. 567,252
11 Claims. (Cl. 111—6)

ABSTRACT OF THE DISCLOSURE

A vehicle having reciprocally mounted spiral fluted conical drills connected to seed and water for planting through a vegetation cover, the drills being free for axial rotation such that each drill first threads downwardly through the vegetation cover into the soil with movement of the vehicle to form a hole and then tumbles the displaced soil back into the holes as it is withdrawn. Control valves operate in conjunction with the reciprocating movement of the drills to deliver measured quantities of seed and water thereto only on the downstroke of the drills, the drills having an opening adjacent their tip covered by a lid which is held closed on the downstroke of the drills by the resistance of the soil which drills engage, but opens on their upstroke so that seed and water fed to the drills discharge into the base of each hole and then is covered with soil. A crank arrangement accelerates the withdrawal of the drills to avoid slashing the vegetation cover as the vehicle continuously proceeds across a field in the planting operation.

This invention relates generally to agricultural equipment, and more particularly to a device useful for planting grain or other seed in undisturbed soil or earth, although the invention is also utilizable as a soil aerator.

When soil is plowed for seeding, the compactness and homogeneity of the soil is disurbed. When the compactness of the soil is disturbed, the moisture well under the surface of the land is no longer conducted or drawn to the surface by roots reaching down to it. The water table of the land loses its natural conductivity and channels. Plowing breaks up and softens surface soil and in so doing the capillarity of the soil is lost. Surface soil that is not webbed by a network of roots tends to dry, crumble and blow away. With the root network gone, rain washes the soil and the land becomes eroded.

In arid regions, such as the southwest United States and India, or in regions which are not habitually arid, but which suffer from draught, surface soil that is not fixed by a web of roots often blows away. On the other hand, if the land is left untilled and a growth of vegetation allowed to form thereover, and this growth is left undisturbed and not plowed under, moisture will be drawn up from deep levels to the roots of said vegetation reaching down for it. In a semi-arid or arid regions, a web of roots and a cover of vegetation over the land are therefore important for holding the soil and to resist erosion.

It is thus a principal object of the present invention to provide means and method of sowing seed into soil without first plowing the same and so that the previous year's growth of grass or weeds and stubble will not be disturbed, and at the same time, the land will be useful to grow a crop such as corn, wheat, or other grain thereon.

A more specific object of the present invention is to provide a seed planting machine employing soil penetrating dibbling devices, including drill bits or thrusters having sharp helical cutting edges which are thrust vertically into the grass, weed, or stubble covered land to pierce therethrough and deposit seed into the soil beneath and at the proper depth, but without destroying the continuity of the overlying vegetation cover and root network and its soil holding characteristics.

Another object of the present invention is to provide such a soil penetrating dibbling device employing drills also having a rotary twist action which assists in their penetrating the soil through the overlying protective vegetation cover thickness.

A feature of the invention is that the mentioned drills or thrusters of the soil penetrating or dibbling devices are hollow and connected to suitably located supplies of water, as well as seed and are adapted for depositing a charge or consignment of both seed and water into the subsoil below the vegetation-covered, root-webbed, unplowed soil.

Thus another feature of the invention is the employment of valve mechanisms under control of the vertically reciprocating soil dibbles or drills so that measured as opposed to random quantities of both seed and water may be deposited into the soil beneath the vegetation cover.

A further feature of the invention is the novel arrangement of thrusters and their connection to the water and seed supply such that the water effectively force feeds the seeds through the thrusters, flushing the seeds through an aperture close to the bottom of the drilling dibbling device.

Another feature of the invention is the novel action of the soil drills or thrusters, which, by reason of their construction, also tumble earth back into the hole during their withdrawal through the vegetation so as to cover the deposited seed.

Still another feature of the invention is the assurance of even uniform planting of grain or other seed independent of the rate of speed at which the planting machine is propelled as it seeds and irrigates the acreage.

Thus, in the accomplishment of the aforementioned objects and features the present invention contemplates a seed planter employing a plurality of thrusters or drills mounted on a frame suspended from the underside of a vehicle adapted to be drawn across a field to be planted. This vehicle also carries a tank of water and a hopper for seed which connect to each said thrusters or drills. The latter comprise inverted conical bits or points having a hollow interior, and each includes at least one aperture connecting their hollow interior portion to the outside of the drill bits. The drill bits also have sharp helical flutes or convolutions on their outer surfaces and are mounted on the mentioned frame so as to be freely rotatable about their axes as they are pressed into the ground by downward movement of the frame. Said frame comprises one portion of a specially constructed crank arrangement which accommodates vertical lowering of the drill bits while compensating for or dissipating the forward motion of the frame so that penetration of the drill bits through the vegetation cover and into the soil below and also their withdrawal through the vegetation is strictly vertical. The vegetation cover therefor is not slashed and remains intact, and useful to combat erosion. When the bits are at the bottom of their stroke (below the vegetation) a measured charge of water and a consignment of seed or grain is fed to each drill or bit and is discharged into the soil at the required planting level, the water being forced through the opening and carrying the seed with it as the drill bits start their upstroke.

Other and further objects, as well as features and advantages of the present invention will be at once apparent or will become so when considering the following description of an illustrated embodiment thereof, given for the purposes of disclosure, and taken in conjunction with the accompanying drawings in which like character references designate like parts throughout the several views.

In said drawing:

FIGURE 1 is a side elevational view of a wheel-mounted vehicle provided with an attached soil dibbling device embodying the present invention;

FIGURE 2 is a top plan view of the device embodying the invention shown in FIGURE 1;

FIGURE 3 is a front elevational view thereof;

FIGURE 4 comprises a sequence of views illustrating the vertical reciprocal movement of the soil dubbling device which is enforced by the invention as the vehicle moves across a field being planted;

FIGURE 5 is a partial elevational view taken along lines 5—5 of FIGURE 4, looking in the direction indicated by the arrows;

FIGURE 6 is a fragmented vertical sectional view of the soil dibbling device;

FIGURE 7 is a fragmented sectional view taken along the lines 7—7 of FIGURE 6;

FIGURE 8 is an enlarged vertical sectional view of the soil dibble or drills to illustrate details thereof including their aperture through which water and seed is discharged and the movable lid which covers the same;

FIGURE 9 is a sectional view taken along the lines 9—9 of FIGURE 8; and

FIGURE 10 is an elevational view of the dibble or drill and shows the sharp helical cutting edges provided about its peripheral surface.

Referring now to the several figures and first to FIGURE 1, considered in conjunction with FIGURES 2 and 3, an agricultural device embodying the present invention is illustrated generally at 11, comprising a vehicle or wagon 13 having a tang 15 attached to its forward end for operative connection to a suitable device, such as a tractor (not shown) used to draw the vehicle 13 across the field in the act of planting the same. Vehicle 13 may also be of the self-propelled type. As shown it supports a tank 17 in overlying relation to a seed hopper 19, the tank 17 being provided with a fill pipe 18 and the seed hopper having a plurality of strategically located entrances in the form of conduits 20 extending through tank 17 by which the seed hopper 19 may be filled. Fertilizer and/or nutrients also may be placed in either the tank 17 or the hopper 19 for addition to the soil either with or in place of the water and seed. Rotatably supported beneath the vehicle 13 are front and rear transversely oriented cranks 21 (one of which is shown clearly in FIGURE 3) having axle constituting ends 22 which pass through provided bearing supports 23 on the underside of the wagon frame 13. Wheels 24 are affixed to the respective axle sections or ends 22 and support the body of vehicle 13 including its tank 17 and seed hopper 19 in spaced relation over the ground. Said axle sections 22 are fixed to the respective wheels so that horizontal portions 25 of said cranks describe a circle having a radius defined by arms 26 thereof as the wheels 24 are rotated in the forward propulsion of the vehicle 13. At 27 is a rectangular frame comprising parallel spaced longitudinal members 31 and lateral members 32. Frame 27 is suspended beneath vehicle 13 between wheels 24 by means of four links 28, each link having its lower end pivotally connected to one end of a respective longitudinal member 31 adjacent a respective corner of the rectangular frame 27 as at 29 and its upper end pivotally connected to horizontal arm 25 of the crank 21 at 30. Said pivotal connections 29 and 30 of the four links thus serve to support frame 27 in a predetermined plane parallel to the vehicle 13 and by reason that their axes parallel the axis of rotation of the vehicle's wheels 24, said frame reciprocates in an essentially vertical direction as the vehicle is propelled in a forward direction across a field. The two longitudinal parallel members 31 support appropriately spaced conical drill bits or thrusters 33, which in the vertical reciprocation of the rectangular frame 27 are caused thereby to move vertically through the top cover of vegetation to bore or otherwise drill into the soil and deposit seed and water to the proper planting level beneath the vegetation cover as will be hereinafter more particularly described. The spacing of longitudinal members 31 is determined by the desired spacing for the rows of seed to be planted and although the invention has been illustrated and described as comprising two rows of thrusters 33, any other number may be employed within the physical limits of the vehicle 13.

It is a feature of the present invention that reciprocation of the rectangular frame 27 comprising the soil dibbling device of the present invention is both carried forward and also lowered by the bell crank 21 so as to properly locate the drill points 33 or thrusters at regular intervals into the soil consistent with the required spacing of each hill of corn, for example, being planted. It also moves the conical drills 33 vertically through the vegetation cover to deposit the corn or other seed with water at the bottom of its stroke in the soil below said vegetation but without being dragged by the forward movement of the frame 13 so as to slash and cut or otherwise destroy the continuity of the vegetation cover with the forward movement of the vehicle. Only so much of the vegetation cover as is required to drop the seed and water therethrough is cut. The piercing of the vegetation is essentially circular and of a diameter not greater than that of the conical bits or thrusters 33 and these are well spaced apart in accordance with the spacing of the seed deposits so that the vegetation cover retains its soil erosion combating character.

Referring now particularly to FIGURE 4 and also FIGURE 5, to be considered in conjunction therewith, it will be appreciated that in position A of the crank 21, when its horizontal portion 25 is at its highest point, the conical drill tips 33 are also maximally spaced above the ground level. Considering that the vehicle 13 is being propelled to the right of the figure, therefore as the wheel 24 rotates it moves to the right as indicated by phantom lines in said A view, carrying frame 27 and the conical drill tips 33 to the right therewith. Simultaneously, however, the horizontal portion 25 of the crank 21 is also moving downwardly, so that the drills 33 follow a generally inclined path toward the ground until horizontal arm 25 of the crank has moved through one quadrant of a circle where it occupies its most forward position considering the circle it describes about the axis of rotation of wheels 24 which turn it. As the wheel continues to rotate, the upper connection 30 of the links 28 to the horizontal crank portion 25 then starts to move to the rear simultaneously as the conical drills 33 pierce through the vegetation cover and into the soil beneath under the weight of the supporting frame 27 and assisted by resilient springs 63 as hereinafter more particularly identified. Since pivotal connections 30 on the crank arm portions 25 are now moving away from and in the opposite direction to the forward movement of wheels 24. Consequently, the conical drill tips 33 move vertically through the vegetation cover and soil and are not dragged by the forward propulsion of the frame 13 to longitudinally cut or slash the vegetation cover at least to any material extent. For all intents and purposes the movement of the drills is vertical. This is diagrammatically ilustrated in view B of FIGURE 4. The length of arm 28 is such that by the time horizontal portion 25 of the cranks has moved to the lowest portion of the circle which it describes, the conical drills or thrusters 33 also will have moved to their required depth and are ready to be withdrawn. This is illustrated by view C and as the crank arms 28 move past said low point and starts to carry their horizontal portions 25 and link connections 30 in an upward direction, this time to the left or rear of the axle on which wheels 24 rotates the crank 21. Rotating simultaneously with cranks 21 are disks 34 at each end thereof. These disks each support a lift pin 35 held thereby at a controlled radial distance from the center of rotation of cranks 21 and ahead of arm portions 26 of the crank 21 and the connections of links 28 thereto at 30. However, the forward spacing of lift pins 35 is such that by the time arms 26 of the cranks 21 have moved past the vertical center line of their arcuate path, lift pins 35 will have engaged link 28 and with the continued rotation of the disks 34 and cranks 21 rapidly pivot links 28 about their connection to frame 27 so that the conical drill bits or thrusters 33 move essentially vertically upwardly out of the soil and vegetation cover. As lift pins 35 continue to rotate with the crank arms 28, pivotal connections 30 are moved thereby past the horizontal center line $h$ as the crank completes rotation through the third quadrant of its described circle of rotation whereupon it assumes the position illustrated by phantom lines in said view D and with continued rotation returns the conical drill bits to the elevated position illustrated by full lines in view A of said FIGURE 4.

Now referring to FIGURE 5, it will be seen that lift pins 35 include a shoulder portion 36 spaced inwardly of their outer end by a suitable encircling spring 38 located between said shoulder and disk 34. The thus exposed end of the lift pins 35 is designated at 39. At 40 is a cam having an arcuate slot 41 seen best in views B and D of FIGURE 4 which receives end 39 of the lift pin as it completes its third quadrant of rotation pivoting link 28 from the position illustrated by full lines in view D of FIGURE 4 to that illustrated by phantom lines in the same view. Once having accomplished this, the lift pins 35 have no further function and are thereafter moved inwardly by cam 40 which protrudes to the right as viewed in FIGURE 5. Cam 40 thereby forces the lift pin to the right against spring 38 which allows its end 39 to move out of engagement with link 28, whereupon as the cranks 21 and disks 34 continue to rotate, lift pins 35 and links 28 return to their starting positions illustrated in view A of said FIGURE 4, completing the cycle. Consequently, both at the bottom stroke of the frame and at the commencement of its upstroke conical drill bits or thrusters 33 move vertically, the rapid rise of lift pins 35 acting on links 28 on the upstroke assuring this. Therefore at least during the interval the thrusters 33 are entering the vegetation cover and being withdrawn therefrom, their movement is vertical and the thrusters are not dragged through the vegetation cover with the forward travel of the vehicle 13.

Referring now particularly to FIGURE 6, the illustrated connection of the thrusters or conical drill bits 33 to the seed supply 19 and water supply 17 and arrangement by which a measured quantity of both seed and water is delivered to each drill 33 and discharged therefrom into the bottom of the holes drilled into the soil by the drills beneath the vegetation cover will now be explained.

On the underside of vehicle 13 and in association with each thruster or conical drill bit 33 carried by the supporting frame 27, are water control means indicated generally at 51 which draw a measured charge of water from tank 17 on the upstroke of the thrusters and then discharge it to the thrusters on their downstroke. Indicated generally at 53 are seed control means which simultaneously withdraw a measured amount of seed from the hopper and then consign it for mixture with the water and eventual discharge therewith. As shown in FIGURE 6, the thrusters 33 comprise a hollow stem 55 fixed in members 31 of the frame 27, their hollow being connected by flexible tube 73 to the seed control means 53 and by a flexible tubing 67 to the water control means 51. Suitable valve controls, not shown may be provided which render said means 51 and 53 inoperative when the device is not being used.

The illustrated form of water control means 51 comprises a rigid inlet conduit 57 which extends up through the seed hopper and opening into the bottom of the water tank 17 connecting said tank with the base of the housing 58 of piston pump 59. As shown in said FIGURE 6, piston pump 59 comprises a plunger 61 biased downwardly within the chamber of the piston pump housing 58 by reacting coil spring 63. Affixed to plunger 61 and extending downwardly therefrom is an operating rod 65 which slidably abuts against the upper surface of the frame 27 supporting the conical drill bits 33. Suitable packing is provided at the lower end of the piston pump 59 through which rod 65 passes. Connected to the lower end of the pump housing 58 and below the lower reach of plunger 61 opposite the connection of said pump housing to inlet conduit 57 is the previously mentioned flexible outlet conduit 67 which operatively connects the pump housing to the mixer chamber 55 of the conical drill bits or thrusters 33. Consequently, in the vertical reciprocal movement of member 27 with the rotation of crank 21, operating rod 65 will be similarly reciprocated. On the upstroke of frame 27 in response to rotation of crank 21, rod 65 will force plunger 61 upwardly against the bias of spring 63 allowing the chamber of housing 58 to fill with water from tank 17. Check valve 69 positioned in the inlet tube 57 permits flow of water from tank 17 into the pump housing on the upstroke of plunger 61 but inhibits flow in the reverse direction. A check valve 71 in the outlet conduit 67 is of the normally closed type which will open only under the added force of spring 63 and plunger 61 on the head of water drawn into the pump housing which occurs on the downstroke of rod 65. Therefore as member 27 moves upwardly the pump draws measured quantities of water into its chamber vacated by the upward displacement of plunger 61 and as the frame 27 moves downwardly with continued rotation of crank 21 to effectively locate the thrusters 33 through the vegetation cover and into the soil beneath, plunger 61 is urged downwardly by spring 63 causing the thus measured quantity of water to move past check valve 71 into the mixer chamber 55 of the respective thruster 33.

Simultaneously, a measured quantity of seed is also deposited through conduit 73 into the chamber 55 to be mixed with the water. Thus, still referring to FIGURE 6, seed control means 53 comprises a funnel shaped receptacle 75 affixed to the bottom wall 76 of the seed hopper 19. As illustrated in FIGURE 6, the bottom wall of the seed hopper 19 comprises a pair of spaced layers 77 and 78 having a slidable member 78 therebetween. In bottom layer 77 are openings 80 in overlying alignment with each funnel shaped receptacle 75. In top layer 78 are similar sized openings 81 but offset with respect to openings 80 in the lower layer which communicates with funnel shaped receptacle 75. Openings 81 are selected to be of a size to receive an approximate number of seeds as is required to be discharged into each hill or drill of seed being planted. Between layers 77 and 78 comprising the floor of the seed hopper is mentioned movable member 79 also having a plurality of holes 82 of the same relative size as openings 81 in the upper layer 78 and openings 80 in the lower layer 77. Member 79 is suitably biased by spring means 84 so that its openings 82 are normally aligned with openings 80 which communicate with the funnel member 75 and are out of alignment with the measuring opening 81 in the top layer of the bottom wall of the seed hopper. At 87 is a vertically reciprocatable rod which actuates closure member 79. As shown in said FIGURE 6, at the lower end of rod is slidably supported on frame 27 so that it rises and falls with the vertical reciprocation of frame 27 with rotation of the mentioned crank 21. Rod 87 also includes an upper end portion 88 which protrudes through provided openings 89, 90 and 91 in the respective lower layer 77, middle closure member 79 and upper layer 78 comprising the floor of the seed hopper 19. Actuating rod 87 has an inclined cam surface 92 immediately below its aligning end 88. Thus it will be appreciated that as frame 27 and its supported conical drills or thrusters 33 are raised by crank 21 to the top of their stroke, cam portion 92 of rod 87 will rise through aligned slots 89, 90 and 91 and by reason of its inclined face move closure member 79 to the right against the bias of spring 84 so as to realign openings 82 therein with measuring openings 81 in the top layer 78 which are kept filled with a predetermined quantity of seed from the hopper. Openings 82 are thus each filled with a consignment of seeds through opening 81. Thereafter, as frame 27 moves downwardly under the actuation of crank 21 to lower the conical drill bits or thrusters 33 through the vegetation cover and into the soil beneath, rod 87 also moves downwardly of its own weight, allowing closure member 79 to move back to the left under the bias of spring 84 whereupon openings 82 filled with seed move out from under openings 81 which are now closed. The consignments of seeds now contained within openings 82 are again realigned by the closure member into alignment with openings 80 in the bottom layer 77, their seeds dropping into the funnel shaped receptacle portion 75 and downwardly along tube 73 for delivery into the mixing chamber 55 of the conical drill bit 33. It will be understood that openings 89, 90 and 91 are so related as to accommodate the necessary rise of rod 87 to control the thus described actuation of closure member 79. At the same time, although the cam 92 moves upwardly through the seed hopper 19, seed cannot escape through these openings. Any other suitable means for discharging a measured quantity of water and a measured quantity of seed into the mixing chamber of the conical drill bits on the upstroke of said bits may be utilized. The thus described arrangement is merely one embodiment useful for this purpose.

Preferably also, as illustrated best by FIGURES 1, 2 and 3, the floor and sides of the seed hopper 19 are sloped to define a pair of V-channels along the apices of which openings 81 are located. Entrance 20 to the seed hopper 19 are also located adjacent each said opening so that seed can be conveniently concentrated and directed to said openings 81 for maximum efficiency in operation of the seed control means 53.

Referring now to FIGURES 8, 9 and 10, the thrusters 33 are illustrated as each comprising a bit 96 of inverted conical shape rotatably mounted in suitable bearings 97 to the underside of the supporting frame 26 so as to be freely rotatable on their own axis as they are forced through the vegetation cover and into the soil beneath on the downstroke of frame 27. Conical bits 96 are also hollow and have communication with mixing chamber 55. Thus, as the thrusters are pushed relatively into the ground through the vegetation cover on the down stroke of the crank 21, under the combined gravitational weight of the rectangle frame 27 itself and the force of springs 63 acting thereon through rod 65, the mixture of water and seed in chamber 55 is directed into the hollow 93 of the conical bits 96 which penetrate to below the vegetation cover. The outer surface of the conical bits 96 are also provided with a sharp helical cutting convolution 95, which assist in assuring a sharp deep positive cut or bore through the vegetation cover and into the soil beneath. As shown best in FIGURES 8 and 9, conical bits 96 have an opening 99 in the channel between the ridges of the cutting convolutions 95 definable thereof and substantially at a height midway of their pointed tip 98 and bearing support 97. This opening is covered by a lid or closure gate 101 pivotally connected at 103. Lid 101 is so located on its pivotal connection that on the down stroke of the bits the soil moving upwardly in the convolution 95 forces the lid against the upper ridge thereof holding the lid closed so that the soil cannot enter opening 99 and neither can water and seed be prematurely discharged therefrom. However, on the reverse stroke of the bits the same force is not applied against lid 101, so that the combined effect of gravity and the force of the water and seed mixture with the bit is sufficient that the lid drops to allow the water and seed to exit through opening 99 and drop into the drill formed by the tip of the drill which is now rising. On the reverse stroke the bits are raised rapidly by the action of the lift pins 35 against pivotal links 28 so that the simultaneous rotation of the convoluted bits 96 and their cutting edges cut across the convolutions formed in the bore on the down stroke thereof causing soil to tumble back into the hole that has just been drilled and to cover the seed and water deposited at the base. Thus the invention is particularly adapted to plant grain, such as corn, wheat and the like in vegetation covered rootwebbed, unplowed soil, the seed and water being simultaneously deposited into holes formed in the sub-soil beneath the vegetation. The seeds are thus planted in evenly spaced hills or drills spaced at regular intervals determined by the spacing of the conical bits of the thrusters on their supporting frame 27 and the length of the crank arms 28 which controls the raising and lowering of the frame 27 in the planting act. The combined effect of pivotally supporting frame 27 on the end of arms 28 of the crank 21 and the utilization of lift pins 35 assures vertical movement of the drill bit 96 in their actual penetration through the vegetation cover and into the sub-soil beneath as well as their withdrawal therefrom so that the turf is not longitudinally slashed. The discharge of the water and seed mixed therewith in chamber 55 is also regulated so that the seed is properly located at the required depth below the vegetation cover and covered with soil which tumbles into the opening on withdrawal of the bits 96 on thrusters 33, it being understood that the vegetation cover tends to resist movement of the soil upwardly and which is taken advantage of to cover the seed with soil on the upstroke of the thrusters.

Ordinarily the vegetation cover will comprise approximately one inch and to locate seed such as corn and soybeans, a thruster bit of about 2½ inches is approximately correct. However, the depth of the bits 96 and the location of openings 99 therein will be determined by individual planting requirements, and for which purposes the thrusters are preferably made detachable and of different sizes for interchange as required.

Obviously, also the device can be used with seed hopper 19 empty of seed and tank 17 empty of water as a means of aerating the soil, as where the soil is found compacted to a condition where there is an insufficient viability. To this purpose bits 96 of the thrusters advantageously will be of a greater depth, for example nearer four inches. Conceivably also, the device can be used to apply fertilizer either in liquid or powder form, either alone or simultaneously with the planting of seed. The device is also obviously useful in planting tilled soil.

From the above description, it will be apparent that all of the recited objects, advantages and features of the invention have been demonstrated as obtainable in a highly practical structure. It will further be understood that although the invention has been described with respect to a specific embodiment thereof, I do not wish to be limited thereby, since various modifications of the invention are intended to be encompassed within its true spirit and scope as indicated by the appended claims.

Having described my invention, I claim:

1. For use with a vehicle to be moved along the ground, a soil dibbling device comprising: in combination, axially rotatable thrust means of inverted conical shape having a peripherally disposed helical cutting edge thereabout, reciprocating means adapting said thrust means for intermittent axial penetration and withdrawal from the soil as the vehicle moves along the ground, and further means associated with said reciprocating means which accelerate movement of the thrust means on the withdrawal thereof so as to enforce vertical reciprocation of the thrust means with respect to the ground as the supporting vehicle is moved therealong.

2. A device for planting seed and water in soil beneath a vegetation cover which is left undisturbed comprising a vehicle for moving across a field to be seeded, a plurality of axially rotatable drills supported thereby for vertical reciprocal movement through the vegetation cover in response to movement of the vehicle thereacross so as to bore holes in the soil beneath and then to recover the holes with the soil as they are withdrawn, said drills being hollow and connected to a supply of seed and water carried by the vehicle, said drills each having an opening spaced above their tip for discharge of water and seed to their hollow interior, and means effecting discharge of the water and seed through said opening only on the upstroke of the drills and while the opening is below the ground level such that the discharged water and seed is covered with soil.

3. A device as claimed in claim 2, wherein the opening in the drills is provided with a cover which is held in closed relation with the opening by the material of the soil which it engages on the downstroke and which swings free on the upstroke to discharge the water and seed into the hole bored below the vegetation cover.

4. A device as claimed in claim 2, wherein each drill has a peripherally located helical cutting edge and the opening exits through the channel defined by said helical edge, the cover being hinged to turn on an axis normal to the drill axis.

5. For use with a vehicle to be moved across a field in a planting operation, the combination of a water tank, a seed hopper, and a soil dibbling device connected to said water tank and seed hopper for discharging water and seed therefrom into the soil comprising thrust means mountable on said vehicle for penetration into and withdrawal from the soil with movement of the vehicle, said thrust means being axially rotatable during said penetration and withdrawal so as to form a hole by displacing the soil and then refilling the same with the displaced soil as it is withdrawn, said thrust means being adapted to discharge seed and water received from the water tank and seed hopper into the hole only between its forming and refilling by the thrust means; and means which enforce essentially vertical movement of said thrust means as it penetrates and is withdrawn from the soil therebelow.

6. The improvement of claim 5 wherein the thrust means comprises: a vertically reciprocal frame and at least one inverted conical bit mounted therebeneath having a hollow interior chamber which connects to said water tank and seed hopper, the outer wall of said conical bit having at least one aperture therein opening into the interior chamber for the discharge therethrough of water and seed into the hole formed by the thrust means penetrating the soil, said conical bit being supported beneath said frame by bearing means which accommodate free rotation of the bit about the central axis thereof as the frame is lowered for penetration of the conical bit into the soil, and at least one outstanding spiral convolution formed on the conical bit for threading the bit into the soil and tumbling soil back into the hole as the bit rotates on its withdrawal therefrom.

7. The improvement of claim 6 having closure means associated with the aperture in the conical bit for opening and closing the aperture.

8. The improvement of claim 6, further including control means which regulate the supply of water from the tank to the conical bit so that water is supplied to the bit only on the downstroke thereof.

9. The improvement of claim 8, further including means operatively connecting the seed hopper to the bit so as to supply a consignment of seed thereto only on the downstroke thereof.

10. The improvement of claim 9, further including a hinged lid closing the aperture of the conical bit as it penetrates the soil and which opens for the discharge of water and seed only on the upstroke thereof.

11. The improvement of claim 5 wherein the axially rotatable thrust means comprises an inverted conical bit having a peripherally disposed helical cutting edge thereabout.

References Cited
UNITED STATES PATENTS

| | | | |
|---|---|---|---|
| 908,874 | 1/1909 | Lochtin | 172—21 |
| 1,098,416 | 6/1914 | Vega y Vega | 111—91 |
| 2,127,510 | 8/1938 | Fulton | 111—89 |
| 2,806,324 | 9/1957 | Ruth et al. | 111—89 XR |

FOREIGN PATENTS

| | | |
|---|---|---|
| 836 | 1852 | Great Britain. |
| 514,521 | 11/1939 | Great Britain. |
| 643,395 | 9/1950 | Great Britain. |
| 316,637 | 12/1956 | Switzerland. |

ROBERT E. BAGWILL, *Primary Examiner.*